United States Patent
Ito et al.

(10) Patent No.: US 7,038,881 B2
(45) Date of Patent: May 2, 2006

(54) MAGNETIC HEAD FOR PERPENDICULAR RECORDING INCLUDING A MAIN POLE HAVING A POLE TIP WITH THREE TAPERED SIDES

(75) Inventors: Kenchi Ito, Sendai (JP); Yoshiaki Kawato, Sendai (JP); Masafumi Mochizuki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 10/648,344

(22) Filed: Aug. 27, 2003

(65) Prior Publication Data
US 2004/0047079 A1  Mar. 11, 2004

(30) Foreign Application Priority Data
Sep. 9, 2002  (JP)  ............................. 2002-262225

(51) Int. Cl.
G11B 5/187 (2006.01)
G11B 5/39 (2006.01)
(52) U.S. Cl. ...................... 360/125; 360/317
(58) Field of Classification Search ................ 360/122, 360/126, 317, 125
See application file for complete search history.

(56) References Cited

U.S. PATENT DOCUMENTS

| | | | |
|---|---|---|---|
| 6,560,069 B1 * | 5/2003 | Litvinov et al. | 360/126 |
| 6,710,973 B1 * | 3/2004 | Okada et al. | 360/125 |
| 6,728,065 B1 * | 4/2004 | Batra et al. | 360/126 |
| 6,771,462 B1 * | 8/2004 | Khizroev et al. | 360/122 |
| 6,775,099 B1 * | 8/2004 | Kuroda et al. | 360/126 |
| 6,813,115 B1 * | 11/2004 | Van der Heijden et al. | 360/125 |
| 6,839,200 B1 * | 1/2005 | Takano et al. | 360/126 |
| 6,842,313 B1 * | 1/2005 | Mallary | 360/319 |
| 6,891,697 B1 * | 5/2005 | Nakamura et al. | 360/125 |

(Continued)

FOREIGN PATENT DOCUMENTS

JP  2001-93112  9/1999

(Continued)

OTHER PUBLICATIONS

Kenchi Ito, Yoshiaki Kawato, Reiko Arai, Tomohiro Okada, Moriaki Fuyama, Yoshihiro Hamakawa, Masahumi Mochizuki, Yoshitaka Nishida, Takayuki Ichihara and Hisashi Takano, "Current Progress of Single-Pole-Type GMR Head for Perpendicular Recording", Technical Digests of the Magnetic Recording Conference, Aug. 2001, p. F5.

(Continued)

Primary Examiner—Jefferson Evans
(74) Attorney, Agent, or Firm—Reed Smith LLP; Stanley P. Fisher, Esq.; Juan Carlos A. Marquez, Esq.

(57) ABSTRACT

The invention provides a magnetic head for perpendicular recording capable of recording with high linear recording density and high track density, and a magnetic disk drive incorporating the same. In order to achieve this, one or more sides of the main pole of the magnetic head for perpendicular recording except for the trailing side are formed in a taper with an appropriate angle against the tip surface of the main pole, and the yoke whose widest principal plane is in parallel to the tip surface is provided on the bottom of the main pole. Thereby, the invention achieves the magnetic head for perpendicular recording that generates a sufficiently high magnetic field, and assumes a sharp gradient of magnetic field on the trailing side. By incorporating this magnetic head, a magnetic disk drive capable of handling high linear recording density can be produced.

15 Claims, 12 Drawing Sheets

U.S. PATENT DOCUMENTS

| | | | |
|---|---|---|---|
| 6,952,325 B1* | 10/2005 | Sato et al. | 360/125 |
| 2001/0028530 A1* | 10/2001 | Yoda et al. | 360/125 |
| 2002/0034043 A1* | 3/2002 | Okada et al. | 360/125 |
| 2002/0036871 A1* | 3/2002 | Yano et al. | 360/317 |
| 2002/0109946 A1* | 8/2002 | Sato et al. | 360/317 |
| 2005/0219747 A1* | 10/2005 | Hsu et al. | 360/126 |
| 2005/0237665 A1* | 10/2005 | Guan et al. | 360/125 |

FOREIGN PATENT DOCUMENTS

| | | | |
|---|---|---|---|
| JP | 2002-133610 A | * | 5/2002 |

OTHER PUBLICATIONS

Shingo Takahashi, Kiyoshi Yamakawa, and Kazuhiro Ouchi, "Ultra-Narrow Track Single Pole Type Head with High Writability", Technical Digests of the Magnetic Recording Conference, Aug. 2001, p. P46.

Yoshiaki Kawato, Masahumi Mochizuki, Chiseki Haginoya and Kenchi Ito, "Single-Pole-Type GMR Heads for Perpendicular Recording at Ultrahigh Areal Densities", CA-01, 8th 3M InterMag Joint Conference, Session CA, Recording Systems 1: Mostly Perpendicular, Jan. 9, 2001, p. 131.

* cited by examiner

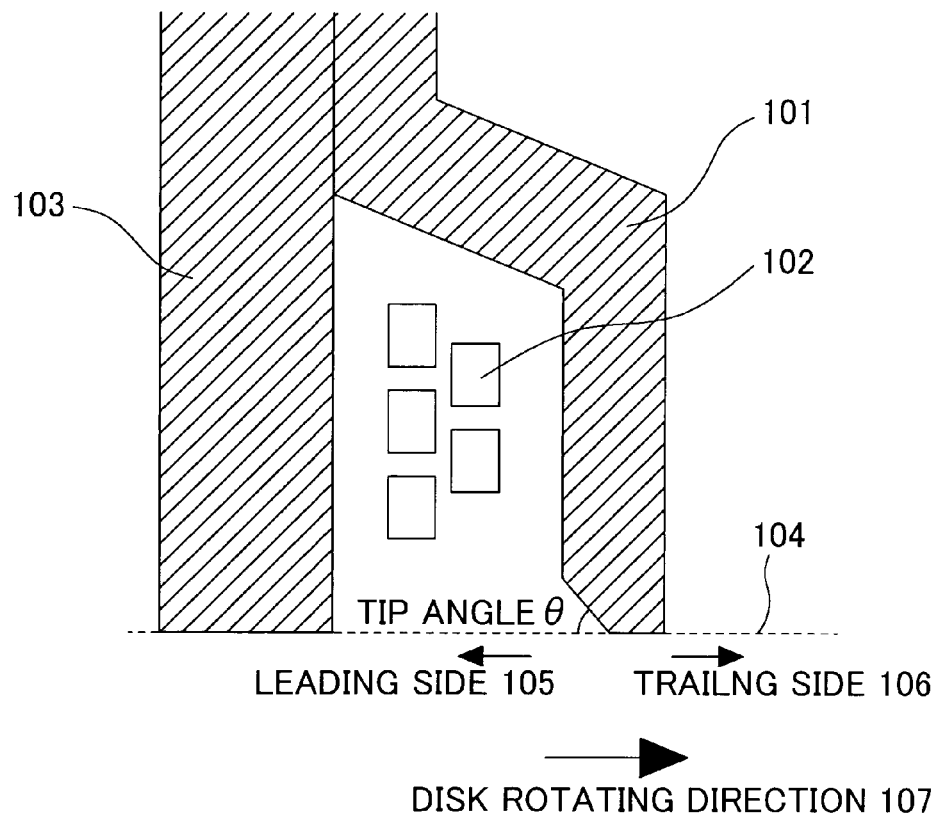
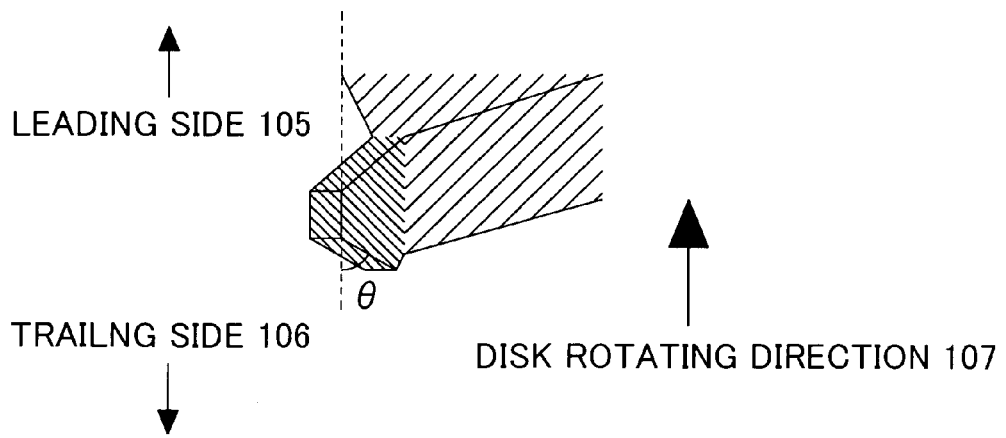

MAGNETIC HEAD FOR PERPENDICULAR RECORDING INCLUDING A MAIN POLE HAVING A POLE TIP WITH THREE TAPERED SIDES

BACKGROUND OF THE INVENTION

1. Field of the Invention

The present invention relates to a magnetic head for perpendicular recording, a method of manufacturing the same, and a magnetic disk drive incorporating the same.

2. Description of the Related Art

The surface recording density of a magnetic disk drive has been increasing steadily, and it is estimated to reach 100 gigabits per square inch in 2003. However, the surface recording method in the current state has a problem that, when the recorded bit length decreases, it becomes extremely difficult to increase the surface recording density due to the thermal fluctuation of magnetization of a medium. In order to solve this problem, the perpendicular recording method that records magnetization signals in the direction perpendicular to the medium has been drawing wide attentions. Especially, the perpendicular recording method that uses a perpendicular recording medium having a soft magnetic backing layer as the magnetic recording medium, and that uses a single-pole magnetic head for recording has been conceived as a method of being immune to the thermal fluctuation and being capable of generating a strong recording magnetic field; and it is accordingly expected as a future magnetic recording method for super high density.

For example, CA-01 of the eighth 3M inter-mag joint conference held in San Antonio US in January 2001 reported the surface recording density of 60 gigabits per square inch in the perpendicular recording. Also, in the perpendicular recording method using the tip surface of a magnetic head, when the recording bit decreases accompanied with increase of the surface recording density, it becomes necessary to decrease the area of the tip surface of a single pole magnetic head in use for recording, which faces the magnetic recording medium. However, to decrease the area of the tip surface of the single pole magnetic head will reduce the possibly generated magnetic field strength substantially in inverse proportion to the area thereof, which will hinder a sufficient recording.

The first method of solving this problem is to increase the saturation magnetic flux density Bs of a magnetic material making up the single pole magnetic head; however, the theoretical limit of the saturation magnetic flux density Bs of a magnetic material is 3.0 tesla, which is only 1.5 times the magnetic flux density of the currently used material, and it is impossible to meet a demand for future high density. The second method of solving this is to devise the shape of a main pole. The JP-A No. 93112/2001, for example, provides a thin film to the tip surface area of the main pole of a perpendicular magnetic head, further provides a minute aperture to the thin film, and provides a tip such that a part of the main pole extends toward this aperture, thereby disclosing a method of enhancing the recording magnetic field at the tip of the main pole. And, the lecture number F5 of the technical digests of the magnetic recording conference held in August 2001 discloses that it is possible to increase the recording magnetic field strength by about 20% in the single pole magnetic head composed of a conventional main pole 101, coil 102, and subordinate pole 103, as illustrated in FIG. 1, by providing a taper part forming an angle θ to a tip surface 104 on the leading side 105 of the main pole. Further, the lecture number P46 of the same magnetic recording conference held in August 2001 discloses that it is possible to generate a magnetic field higher than the saturation magnetic flux density Bs, which is considered as the limit up to now, by providing four taper parts 203 on the tip of a main pole 204, as shown in FIG. 2, and by providing a tip 202 having a small tip surface area 201 on the top thereof.

However, these conventional proposals involve the following problems.

The method of providing a thin film to the tip surface area of the main pole of a perpendicular magnetic head, further providing a minute aperture to the thin film, and providing a tip such that a part of the main pole extends toward the aperture is capable of precisely controlling the amount of projection of the tip, which is advantageous; however, to shorten the length of the projection in order to increase the magnetic field strength permissible of being generated will increase leakage magnetic fields from the other parts than the projection, which leads to impossibility of recording with high linear recording density, and causes a problem of erasing information of adjacent tracks.

In the method of providing the tip of the main pole with the taper part only on the leading side, as shown in FIG. 1, the magnitude of reinforcing the magnetic field is insufficient. In the method of providing the taper parts on all the sides of the main pole, as shown in FIG. 2, since the expansion of magnetic field becomes very large, the gradient of recording magnetic field in the disk rotating direction is too small to write with high linear recording density; besides, the method creates a problem of erasing information of adjacent tracks.

SUMMARY OF THE INVENTION

Accordingly, it is an object of the invention to provide a magnetic head for perpendicular recording that is capable of recording with high linear recording density and high track density without reducing the recording magnetic field strength, a method of manufacturing the same, and a magnetic disk drive incorporating the same.

In order to accomplish the above object, the magnetic head and the magnetic disk drive relating to the invention are provided with a magnetic head having a perpendicular recording head that possesses the following features. The perpendicular recording head includes a main pole, and a first yoke provided on the opposite side of the tip surface of the main pole that faces a perpendicular magnetic recording medium. The principal plane having the widest area in the first yoke is in parallel to the tip surface. And, at least one or more sides of the side on the leading side of the main pole, the first side substantially parallel to the tracking direction, and the second side opposite to the first side, substantially parallel to the tracking direction are slanted against the vertical direction.

In the magnetic head for perpendicular recording according to the invention, at least one or more sides of the main pole except for the trailing side are tapered with an appropriate angle against the tip surface, and the yoke of which widest principal plane is in parallel to the tip surface is provided on the bottom of the main pole. Concretely, the perpendicular recording head includes the main pole, and the yoke (first yoke) provided on the opposite side to the tip surface of the main pole that faces the perpendicular recording medium. In this construction, the principal plane having the widest area in the yoke is in parallel to the tip surface. And, at least more than one of the sides of the main pole except for the upstream side in the rotating direction of the recording medium, namely, the trailing side (in other words, at least one or more sides of the side on the leading side of the main pole, the first side substantially parallel to the tracking direction, and the second side opposite to the first side, substantially parallel to the tracking direction) are slanted against the vertical direction. Thereby, the construction achieves the magnetic head for perpendicular recording that generates a sufficiently high magnetic field, and assumes a sharp gradient of magnetic field on the trailing side. By incorporating this magnetic head, a magnetic disk drive capable of handling high linear recording density can be produced.

BRIEF DESCRIPTION OF THE DRAWINGS

FIG. 1 illustrates a conventional magnetic head for perpendicular recording, which is provided with a taper part on the leading side of the head;

DETAILED DESCRIPTION OF THE PREFERRED EMBODIMENTS

Figure 2:
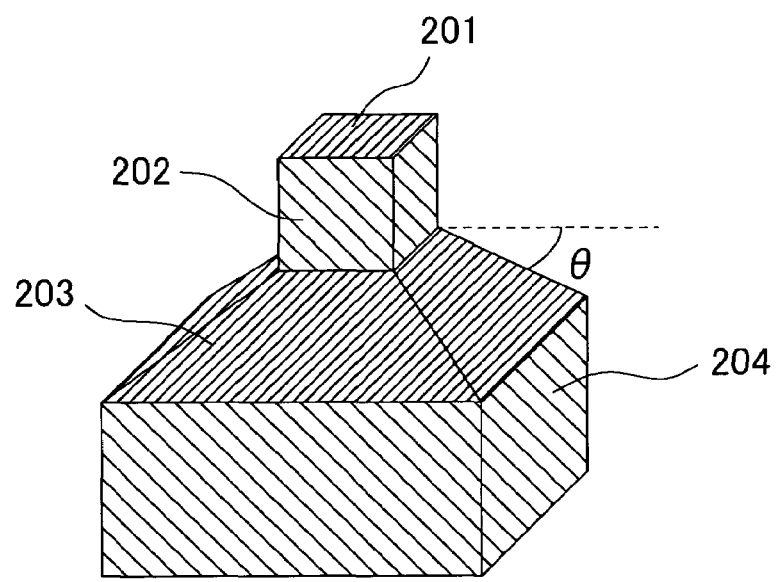
FIG. 2 illustrates a conventional magnetic head for perpendicular recording, which is provided with taper parts on four sides of a single pole magnetic head.

The invention will now be described in detail.

The magnetic head for perpendicular recording of the invention includes a reproduction head using the magnetoresistance effect, and a single-pole magnetic head for perpendicular recording, in which the recording and reproduction heads are formed with a thin film in a separate structure; and the heads are operational with a perpendicular magnetic recording medium having a soft magnetic backing layer. The perpendicular recording head possesses a main pole, and a yoke (first yoke) provided on the opposite side to a tip surface of the main pole that faces the perpendicular recording medium. In this construction, the principal plane having the widest area in the yoke is in parallel to the tip surface. And in addition, at least more than one of the sides of the main pole except for the upstream side in the rotating direction of the recording medium, that is, the trailing side (in other words, at least one or more sides of the side on the leading side of the main pole, the first side substantially parallel to the tracking direction, and the second side opposite to the first side, substantially parallel to the tracking direction) are slanted against the vertical direction.

Especially, the main pole is connected to the yoke substantially on the center of the principal plane having the widest area in the yoke. Further, a coil of at lest one turn for exciting magnetic fluxes in the main pole is disposed virtually about the main pole.

On the other hand, in the magnetic head for perpendicular recording, a magnetic film or a multi-layered magnetic film making up the reproduction head is formed in parallel to the tip surface, and a yoke (second yoke) is provided which introduces the magnetic fluxes leaked from the magnetic recording medium into the reproduction head.

Especially, in the magnetic head for perpendicular recording, the yoke for introducing the magnetic fluxes leaked from the magnetic recording medium into the reproduction head is made up with two separate magnetic substances. And, each of the magnetic substances is provided on the upstream side in the rotating direction of the recording medium, namely, the trailing side, and on the downstream side, namely, the leading side. Further, in the magnetic head for perpendicular recording, the yoke (first yoke) connected to the main pole is connected to the reproduction head, which is also served as the yoke (second yoke) for introducing the magnetic fluxes leaked from the magnetic recording medium into the reproduction head.

Further, in the magnetic head for perpendicular recording, at least more than one of the sides of the yoke for introducing the magnetic fluxes leaked from the magnetic recording medium into the reproduction head, except for the upstream side in the rotating direction of the recording medium, namely, the trailing side, are slanted against the vertical direction.

Further, in the magnetic head for perpendicular recording, the second yoke for introducing the magnetic fluxes leaked from the magnetic recording medium into the reproduction head is made up with two separate magnetic substances. And, each of the magnetic substances is provided on the upstream side in the rotating direction of the recording medium, namely, the trailing side, and on the downstream side, namely, the leading side. And, as to the shape of the magnetic substance provided on the trailing side, at least more than one of the sides except for the leading side (in other words, at least one or more sides of the side on the trailing side, the first side substantially parallel to the tracking direction, and the second side opposite to the first side, substantially parallel to the tracking direction) are slanted against the vertical direction; as to the shape of the magnetic substance provided on the leading side, at least more than one of the sides except for the trailing side (in other words, at least one or more sides of the side on the leading side, the first side substantially parallel to the tracking direction, and the second side opposite to the first side, substantially parallel to the tracking direction) are slanted against the vertical direction.

Further, in the magnetic head for perpendicular recording, the angle θ that the tip surface of the main pole and the side of the main pole located on the downstream side in the rotating direction of the recording medium, namely, the leading side form is set between 25° and 65°.

Further, in the magnetic head for perpendicular recording, the angle θ that the side vertical to the tip surface of the main pole and the side of the main pole located in the direction orthogonal to the rotating direction of the recording medium form is set to 20° or below. Or, in the magnetic head for perpendicular recording, the ratio V2/V1 of the volume V1 of the main pole against the volume V2 of the yoke is set to 10 or over.

The magnetic head to which the invention is applied, and the magnetic disk drive incorporating the same will be described with reference to the accompanying drawings.

Figure 3A:
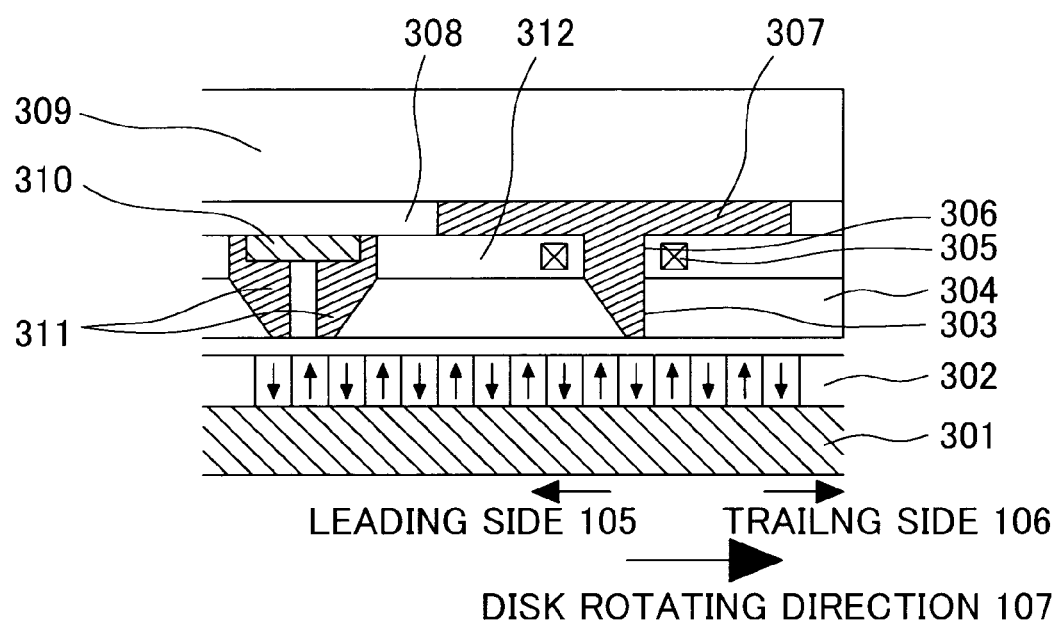
FIG. 3A illustrates the plan view of a magnetic head for perpendicular recording of the first embodiment of the present invention.
Figure 3B:
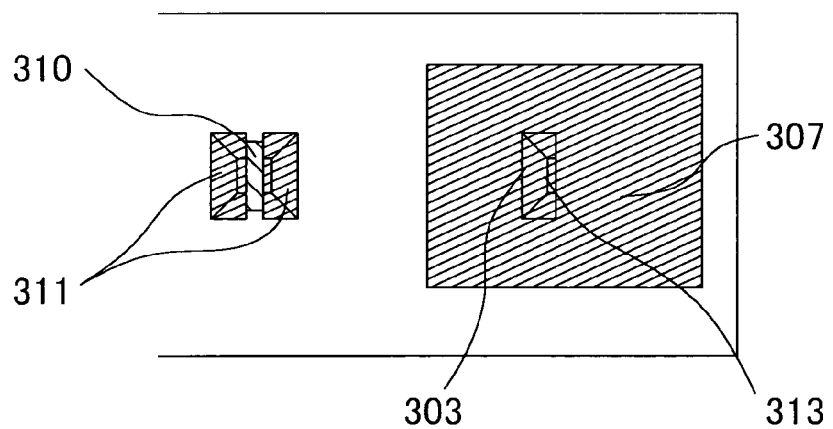
FIG. 3B illustrates the sectional view of a magnetic head for perpendicular recording of the first embodiment of the present invention.

FIGS. 3A and 3B schematically illustrate the magnetic head for perpendicular recording according to the first embodiment of the invention. FIG. 3A is a sectional view, and FIG. 3B is a plan view (here, the magnification is not uniform in these drawings). In FIGS. 3A and 3B, the numeric symbol 301 denotes a soft magnetic backing layer, 302 a perpendicular recording medium, 303 a main-pole taper part of the magnetic head for perpendicular recording, 304 an inorganic insulating layer, 305 a coil for exciting magnetic fluxes in the main pole, and 306 a main pole body. In this embodiment, the coil is wound by one turn virtually around the main pole body, in parallel to the tip surface of the magnetic head for perpendicular recording; however the number of turns of the coil may be two or more.

The numeric symbol 307 denotes a first yoke disposed substantially in parallel to the surface of the recording medium, 308 an inorganic insulating layer for embedding the yoke, formed on a substrate 309, 310 a reproduction head using the magnetoresistance effect such as the AMR, GMR, TMR, or the like, 311 a second yoke for introducing the magnetic fluxes from the magnetic recording medium into the reproduction head, and 312 an inorganic insulating layer for embedding the coil. Now, the characteristics that this magnetic head for perpendicular recording achieves will be described in detail with graphs.

Figure 4A:
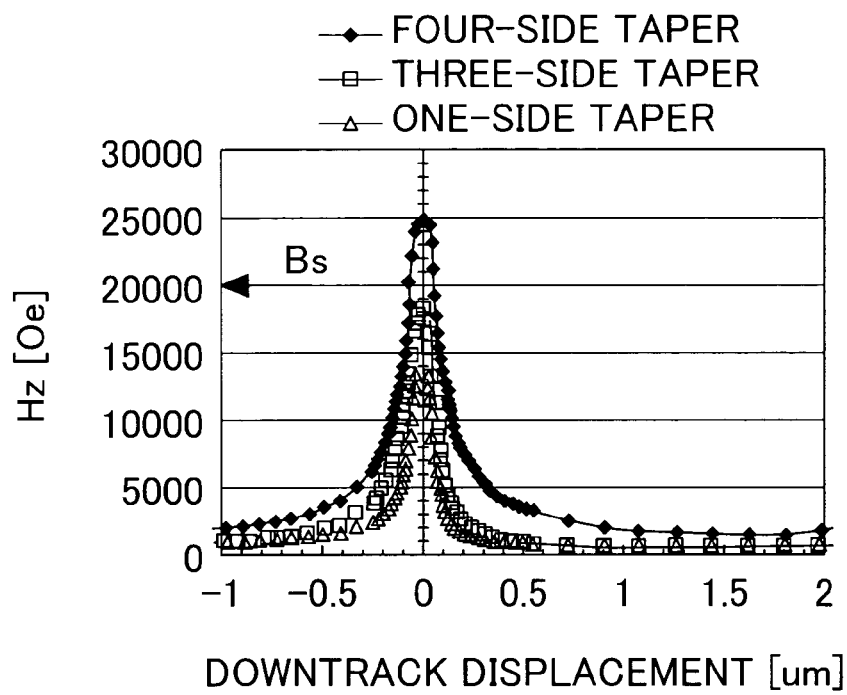
FIG. 4A illustrates a distribution of the magnetic field along the circumference of a disk, which is generated by the magnetic head for perpendicular recording of the first embodiment, and shows the absolute values of the magnetic field.
Figure 4B:
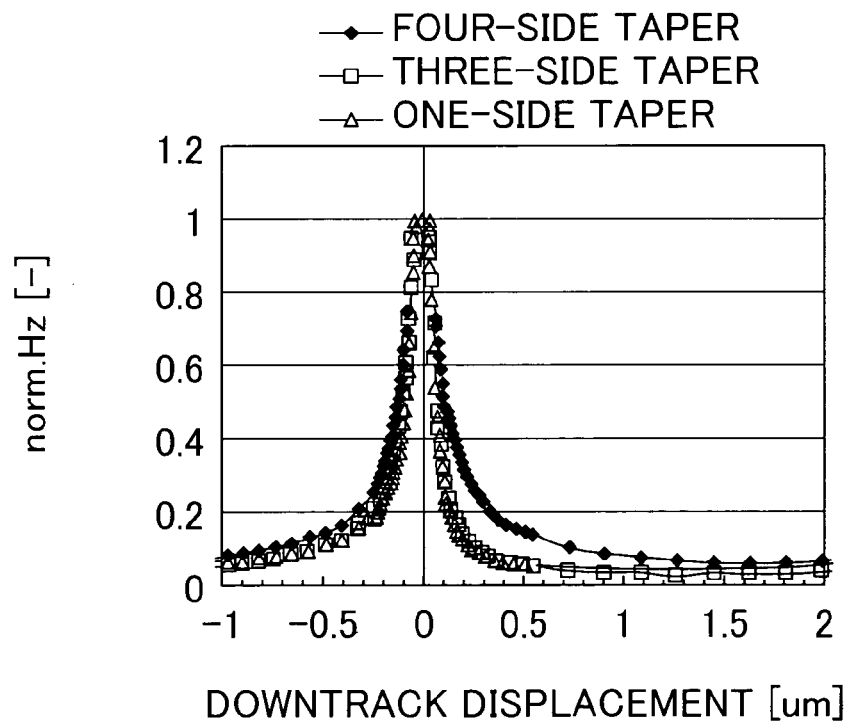
FIG. 4B illustrates a distribution of the magnetic field along the circumference of a disk, which is generated by the magnetic head for perpendicular recording of the first embodiment, and shows the normalized values of the magnetic field.

FIGS. 4A and 4B illustrate a distribution of the magnetic field in the circumferential direction of a disk, which is generated by the magnetic head for perpendicular recording of the invention. In this example, the saturation magnetic flux density Bs of the magnetic substance making up the main pole is 2.0 tesla. The section of the main pole body 306 in the direction parallel to the tip surface is 1.64 µm×1.64 µm, and the height thereof is 1.0 µm. The height of the taper part 303 is 0.63 µm, the angle θ of the taper part 303 is 50°, and the surface area of an exposed part 313 on the tip of the taper part is 100 nm×100 nm. The dimension of the yoke 307 is 1 µm thick, and 7×7 µm large.

From FIGS. 4A and 4B, the maximum magnetic field strength of the magnetic head for perpendicular recording of this embodiment is found to be about ¾, in comparison to the four-side taper type being equivalent to the known example in FIG. 2. However, a high magnetic field strength as not lower than 90% of Bs is maintained, and a high value of more than 25% is secured in comparison to the head having a taper part only on the leading side, which is equivalent to the conventional example in FIG. 1. The linear recording density of the recording bit in the perpendicular recording is determined by the gradient of magnetic field strength on the trailing side of the main pole of the magnetic head. However, the gradient of magnetic field on the trailing side of the magnetic head for perpendicular recording of this embodiment (shown by the arrow in FIGS. 4A and 4B) is equal to or larger than that of the head having the taper part only on the leading side, which is equivalent to the conventional example in FIG. 1; and this is extremely large in comparison to the four-side taper type being equivalent to the known example in FIG. 2. Thus, the magnetic head for perpendicular recording of this embodiment confirms to effect both the high magnetic field strength, and the large gradient of magnetic field that enables recording with high linear recording density.

Figure 5:
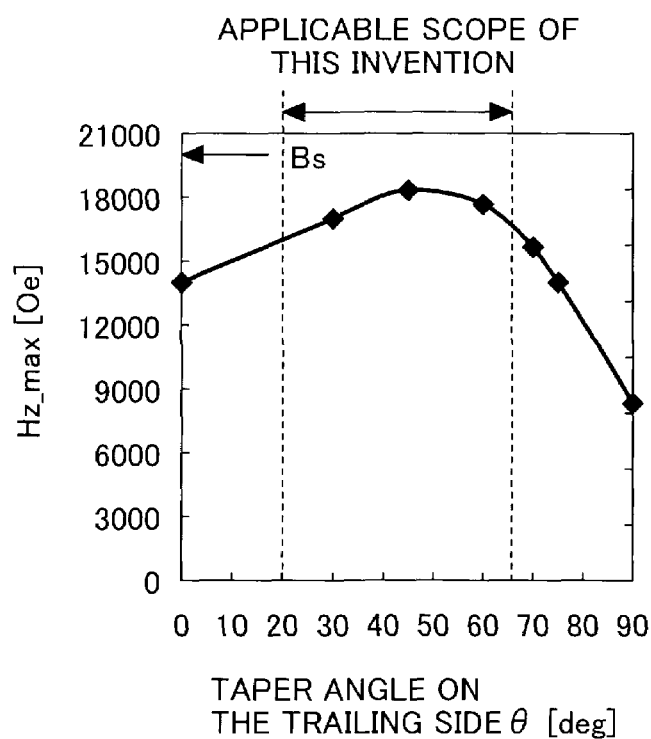
FIG. 5 illustrates the variation of the maximum magnetic field strength Hz_max against the variation of the angle θ of a taper part on the leading side of the magnetic head for perpendicular recording of the first embodiment.

FIG. 5 illustrates the variation of the maximum magnetic field strength Hz_max in the above embodiment, when the angle θ of the taper part on the leading side is varied. FIG. 5 confirms that, when the angle θ is within the range of 20° through 65°, the magnetic head of the embodiment attains such a high magnetic field strength as not lower than 80% of Bs.

Figure 6:
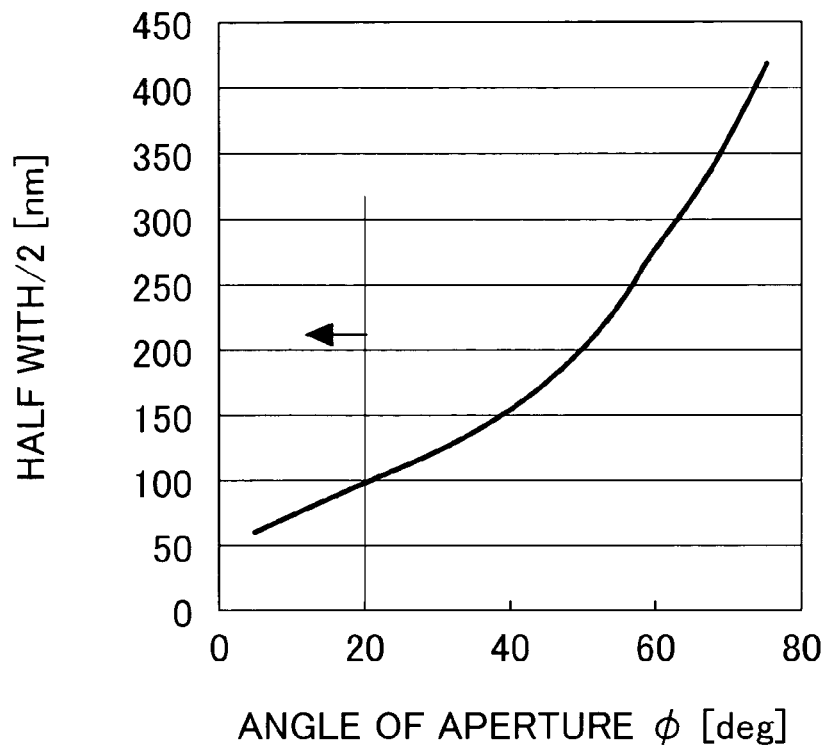
FIG. 6 illustrates the variation of the half width of the magnetic field distribution in the direction orthogonal to the disk rotating direction, when the angle φ is varied which is formed by the two taper sides provided in the direction orthogonal to the disk rotating direction and the side perpendicular to the tip surface, in the magnetic head for perpendicular recording of the first embodiment.

FIG. 6 is a graph illustrating the variation of the half width of the magnetic field distribution in the direction orthogonal to the disk rotating direction, when the angle φ) is varied which is formed by the two taper sides provided in the direction orthogonal to the disk rotating direction and the side perpendicular to the tip surface.

In this case, since the width of the exposed part 313 on the tip of the taper part is 100 nm, if the angle φ is 20° or below, the half width of the magnetic field strength distribution will become not more than half the width of the exposed part 313, which does not create a problem of erasing information of adjacent tracks during the recording operation. Thus, if the angle θ is set to 50° and the angle φ is set to 20°, the maximum magnetic field will slightly be lowered in comparison to the case of FIGS. 4A and 4B to be about 85% of Bs. However, the data show that the magnetic head for perpendicular recording satisfies all the characteristics of a high magnetic field strength, a large gradient of magnetic field in the disk rotating direction that enables recording with high linear recording density, and a satisfactory recording cross talk characteristic such that there will not occur a problem of erasing information of adjacent tracks.

Figure 7:
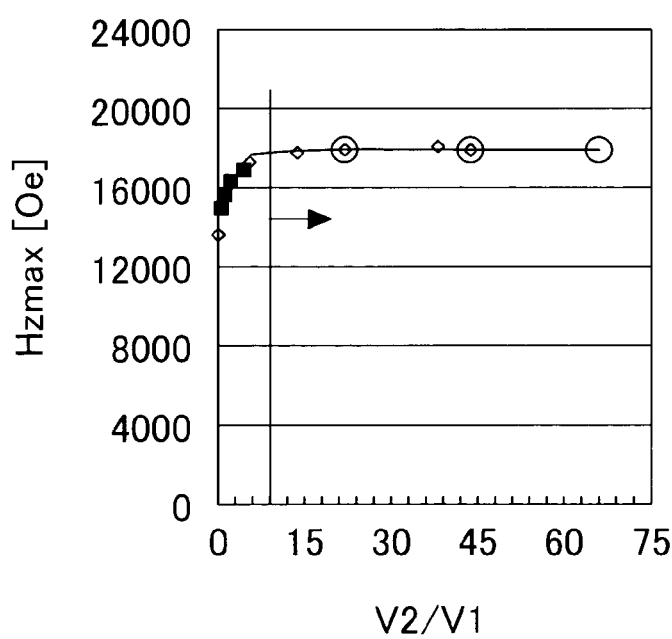
FIG. 7 illustrates the variation of the maximum magnetic field strength Hz_max, when the ratio of the volume V2 f the yoke is varied against the volume V1 f the main pole having the body and taper part combined.

FIG. 7 illustrates the variation of the maximum magnetic field strength Hz_max, when is varied the ratio of the volume V2 of the yoke 307 against the volume V1 of the main pole having the body 306 and taper part 303 combined. FIG. 7 shows that as V2/V1 exceeds 10, Hz_max becomes constant. In this embodiment, since V1 is equal to 3.3 µm³, V2 needs to be 33 µm³ at minimum. If the thickness of the yoke 307 is set to 1 µm, the area of the yoke will be sufficient with the square of one side 5.7 µm. This shows that the recording head of this embodiment can be made extremely small. Since the volume of the recording head is small, and the number of turns of the coil is as few as one turn, the high frequency characteristic of the recording head during recording is satisfactory; and it can be said that the recording head is suitable for a magnetic disk drive to which a future high transmission speed is demanded.

The reproduction head 310 of the first embodiment illustrated in FIGS. 3A and 3B has the following features. The reproduction head 310 is different from the conventional magnetic reproduction head, in which a magnetic film or a multi-layered magnetic film making up the reproduction head is formed in parallel to the tip surface, and there is provided the yoke 311 for introducing the magnetic fluxes leaked from the magnetic recording medium 302 into the reproduction head 310.

Especially in this embodiment, the yoke 311 is made up with two separate magnetic substances, and each of the magnetic substances is provided on the upstream side in the rotating direction of the recording medium, namely, the trailing side, and on the downstream side, namely, the leading side. The gap between the two magnetic substances of the yoke 311 is made in substantially the same length as the minimum bit length in the circumferential direction of the magnetic disk drive incorporating the reproduction head. When this type of yoke is used, the magnetic field leaked from a bit part recorded by an upward magnetization enters one magnetic substance of the yoke that overlies the bit part, and permeates the magnetic film of the reproduction head, which is absorbed from the other magnetic substance of the yoke into a bit part recorded by a downward magnetization, being adjacent to the bit part recorded by the upward magnetization.

Adopting this type of structure will enhance the detection efficiency of the leakage magnetic flux, in the first place, which allows making up a high-efficiency reproduction head. In the second place, the waveform detected from the perpendicular recording medium 302 differs from the rectangular waveform reproduced by the conventional GMR head, and assumes a reproduction waveform of the Lorentz type that is reproduced from the conventional surface recording medium. Therefore, the signal processing circuit is not needed to contain a circuit that deteriorates the signal-to-noise ratio (SNR), and the conventional one can be used as it is.

Figure 8A:
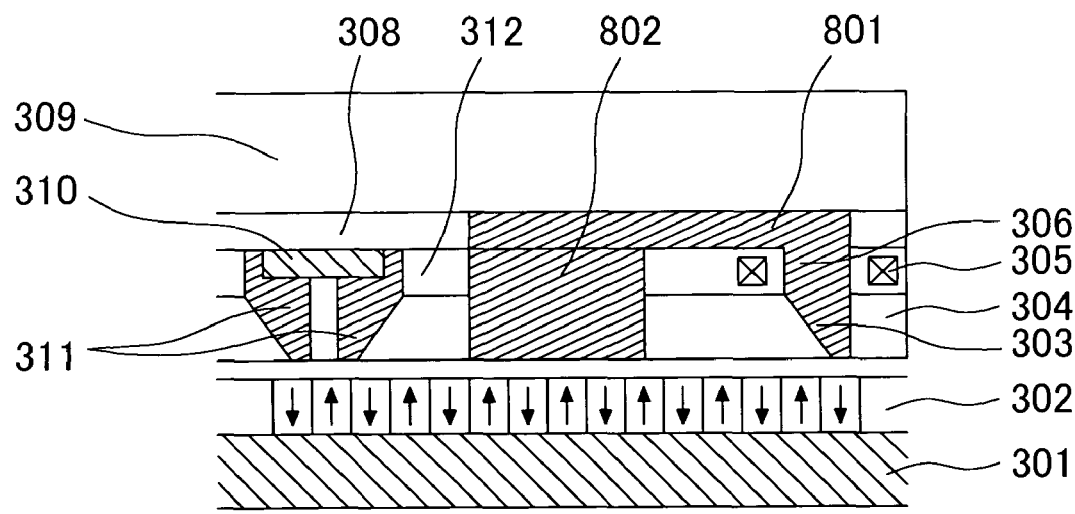
FIG. 8A illustrates the plan view of a magnetic head for perpendicular recording of the second embodiment of the invention.
Figure 8B:
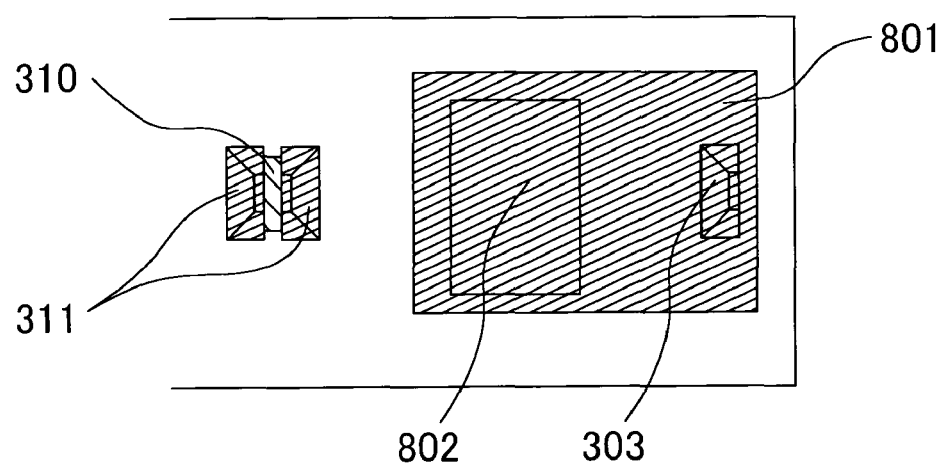
FIG. 8B illustrates the sectional view of a magnetic head for perpendicular recording of the second embodiment of the invention.

FIGS. 8A and 8B illustrate a schematic drawing of a magnetic head for perpendicular recording of the second embodiment (here, the magnification of the drawing is not uniform). FIG. 8A is a sectional view, and FIG. 8B is a plan view. In FIGS. 8A and 8B, the numeric symbol 301 denotes the soft magnetic backing layer, 302 the perpendicular recording medium, 303 the main-pole taper part of the magnetic head for perpendicular recording, 304 the inorganic insulating layer, 305 the coil for exciting magnetic fluxes in the main pole, and 306 the main pole body.

In this embodiment, the coil is wound by one turn virtually around the main pole body, in parallel to the tip surface of the magnetic head for perpendicular recording; however the number of turns of the coil may be two or more. The numeric symbol 801 denotes a yoke (first yoke) disposed substantially in parallel to the surface of the recording medium, 802 a subordinate magnetic pole for circulating magnetic fluxes, 308 the inorganic insulating layer for embedding the yoke, formed on the substrate 309, 310 the reproduction head using the magnetoresistance effect such as the AMR, GMR, TMR, or the like, 311 the yoke for introducing the magnetic fluxes from the magnetic recording medium into the reproduction head, and 312 the inorganic insulating layer for embedding the coil. In this embodiment, the main pole body 306 is formed on one end of the yoke 801, and the subordinate magnetic pole 802 is formed on the opposite end to the main pole body 306, and thereby the excitation power of the magnetic head is further enhanced, which is the feature of this embodiment.

Figure 9A:
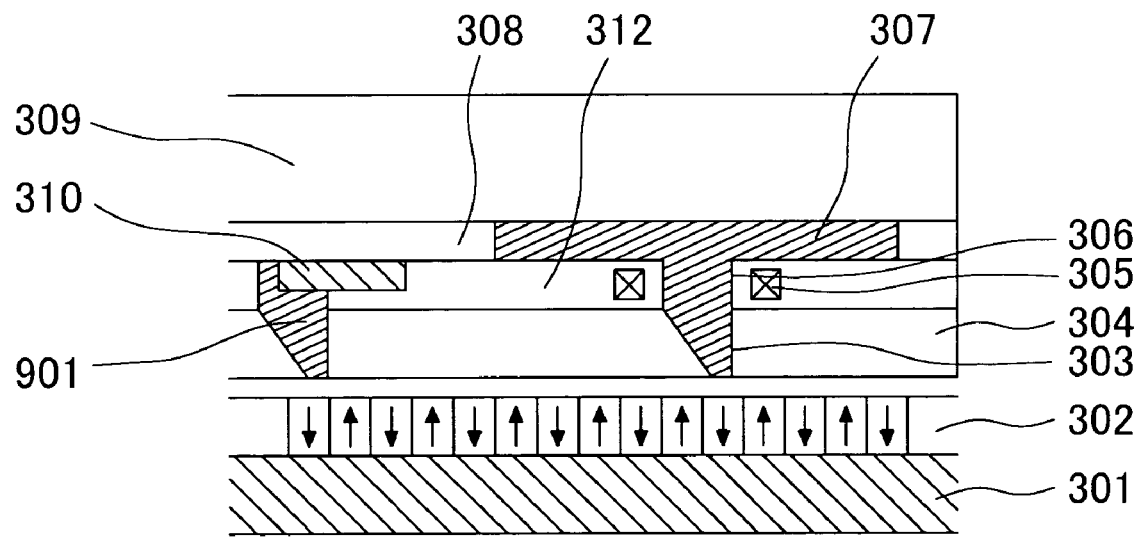
FIG. 9A illustrates the plan view of a magnetic head for perpendicular recording of the third embodiment of the invention.
Figure 9B:
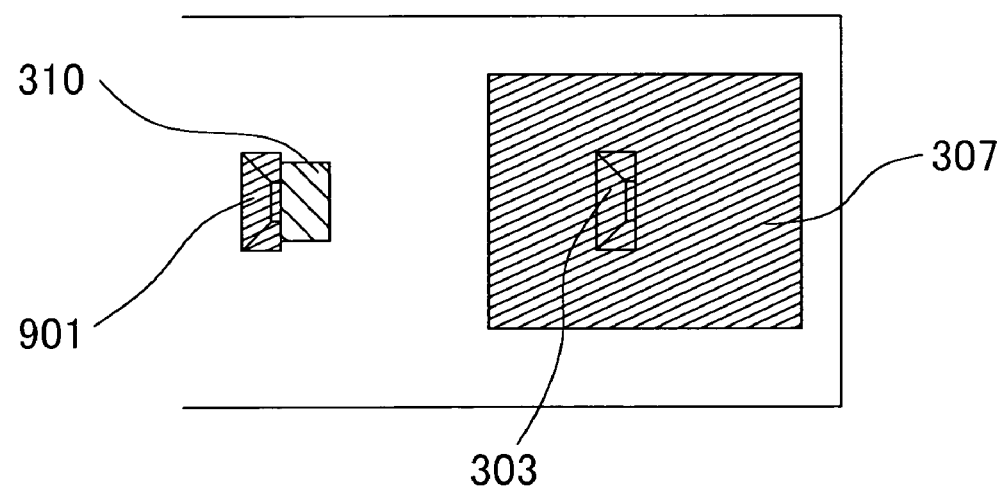
FIG. 9B is the sectional view of a magnetic head for perpendicular recording of the third embodiment of the invention.

FIGS. 9A and 9B illustrate schematic drawings of a magnetic head for perpendicular recording of the third embodiment (here, the magnification of the drawing is not uniform). FIG. 9A is a sectional view, and FIG. 9B is a plan view. In FIGS. 9A and 9B, the numeric symbol 301 denotes the soft magnetic backing layer, 302 the perpendicular recording medium, 303 the main-pole taper part of the magnetic head for perpendicular recording, 304 the inorganic insulating layer, 305 the coil for exciting magnetic fluxes in the main pole, and 306 the main pole body. In this embodiment, the coil is wound by one turn virtually around the main pole body, in parallel to the tip surface of the magnetic head for perpendicular recording; however the number of turns of the coil may be two or more.

The numeric symbol 307 denotes the yoke disposed substantially in parallel to the surface of the recording medium, 308 the inorganic insulating layer for embedding the yoke, formed on the substrate 309, 310 the reproduction head using the magnetoresistance effect such as the AMR, GMR, TMR, or the like, 312 the inorganic insulating layer for embedding the coil, and 901 a yoke (second yoke) for introducing the magnetic fluxes from the magnetic recording medium into the reproduction head. Thus, the third embodiment is characterized in that the second yoke 901 is made up with one piece of magnetic substance having substantially the same structure as the taper part of the main pole.

Figure 10A:
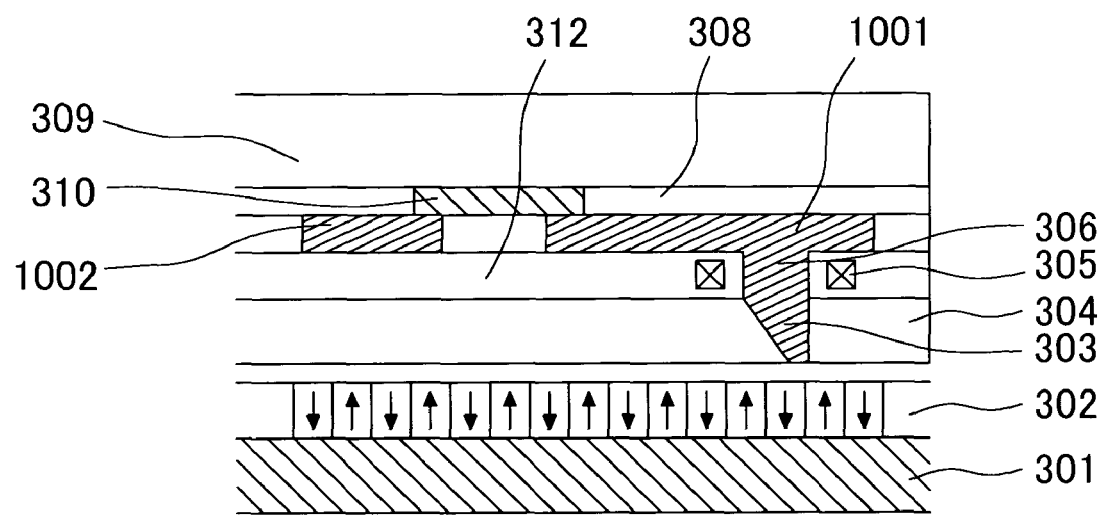
FIG. 10A illustrates the plan view of a magnetic head for perpendicular recording of the fourth embodiment of the invention.
Figure 10B:
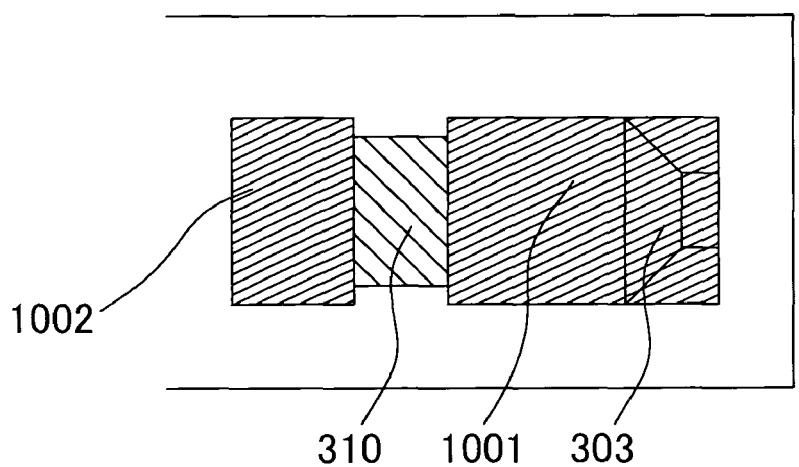
FIG. 10B illustrates the sectional view of a magnetic head for perpendicular recording of the fourth embodiment of the invention.

FIGS. 10A and 10B illustrate schematic drawings of a magnetic head for perpendicular recording of the fourth embodiment (here, the magnification of the drawing is not uniform). FIG. 10A is a sectional view, and FIG. 10B is a plan view. In FIGS. 10A and 10B, the numeric symbol 301 denotes the soft magnetic backing layer, 302 the perpendicular recording medium, 303 the main-pole taper part of the magnetic head for perpendicular recording, 304 the inorganic insulating layer, 305 the coil for exciting magnetic fluxes in the main pole, and 306 the main pole body.

In this embodiment, the coil is wound by one turn virtually around the main pole body, in parallel to the tip surface of the magnetic head for perpendicular recording; however the number of turns of the coil may be two or more. The numeric symbol 1001 denotes a yoke (first yoke) disposed substantially in parallel to the surface of the recording medium, 1002 a subordinate yoke (second yoke) for circulating magnetic fluxes, 308 the inorganic insulating layer for embedding the yoke, formed on the substrate 309, 310 the reproduction head using the magnetoresistance effect such as the AMR, GMR, TMR, or the like, and 312 the inorganic insulating layer for embedding the coil. In this embodiment, the yoke 1002 connected to the main-pole taper part 303 and the main pole body 306 is different from the above two cases of the magnetic head for perpendicular recording, and it also combines the function to lead the magnetic fluxes from the perpendicular recording medium 302 into the reproduction head 308, which effects further miniaturization of the head.

Figure 11A:
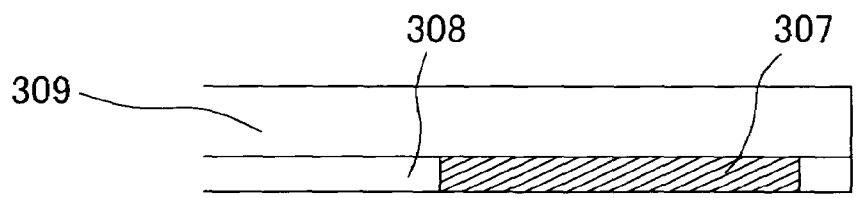
FIGS. 11A, 11B, 11C, 11D, 11E, and 11F schematically illustrate the steps of forming the main pole of the magnetic head in the above embodiments (here, the magnification is not uniform in FIG. 11A through FIG. 11F)

FIGS. 11A to 11F schematically illustrate the steps of manufacturing the magnetic head according to the invention (here, the magnification of the drawing is not uniform). Although these steps shown here are those for the first embodiment in FIGS. 3A and 3B, the manufacturing steps for the other embodiments are almost the same. First of all, as shown in FIG. 11A, the yoke 307 is formed on the substrate 309 (of Si, for example, which is not limited to this), over which the inorganic insulating layer 308 is formed; and the inorganic insulating layer 308 is flattened to the lower surface of the yoke 307 by means of the chemical mechanical polishing (CMP) or the like.

Figure 11B:
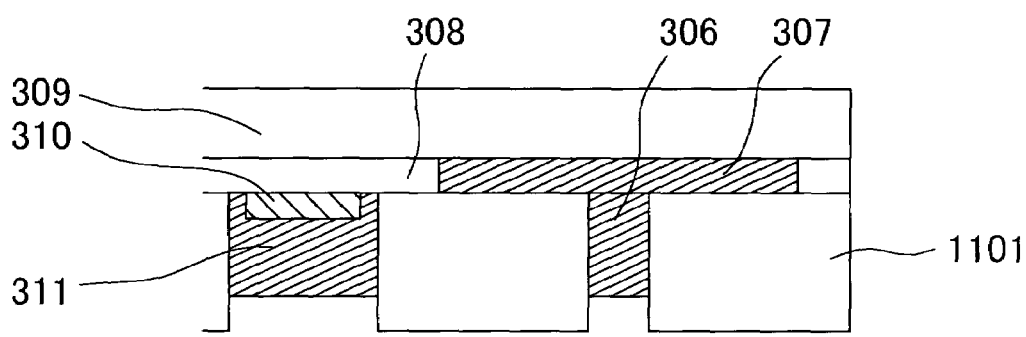

To form the inorganic insulating layer, SiC, AlN, $Ta_2O_5$, TiC, $TiO_2$, $SiO_2$, or the like can be used, other than the conventionally used $Al_2O_3$. Next, the magnetic film of the reproduction head 310 is formed, which is made into a predetermined size, and electrodes (not illustrated in FIGS. 3A and 3B and FIGS. 11A through 11F) are formed, through which currents are supplied to the reproduction head for detection. Thereafter, a resist pattern 1101 is formed as shown in FIG. 11B, and the main pole body 306 of the recording head and the yoke 311 for introducing magnetic fluxes into the reproduction head are formed with the resist pattern, by means of the electric field plating method, the spattering method, or the like.

Figure 11C:
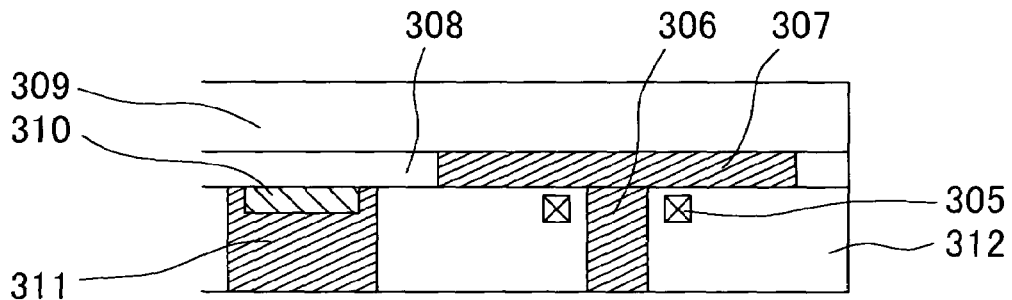

Next, the resist is removed, and the coil 305 is formed, and then the inorganic insulating layer 312 is again formed, which is flattened as shown in FIG. 11C, by means of the Chemical Mechanical Polishing (CMP) or the like.

Figure 11D:
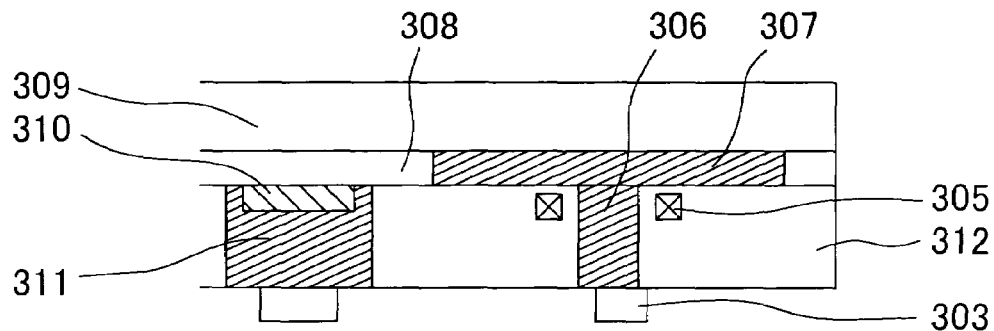

Next, a resist pattern 1102 for taper etching is formed on the magnetic film, as shown in FIG. 11D, that forms the main pole body 306 of the recording head and the yoke 311 for introducing magnetic fluxes into the reproduction head.

Figure 11E:
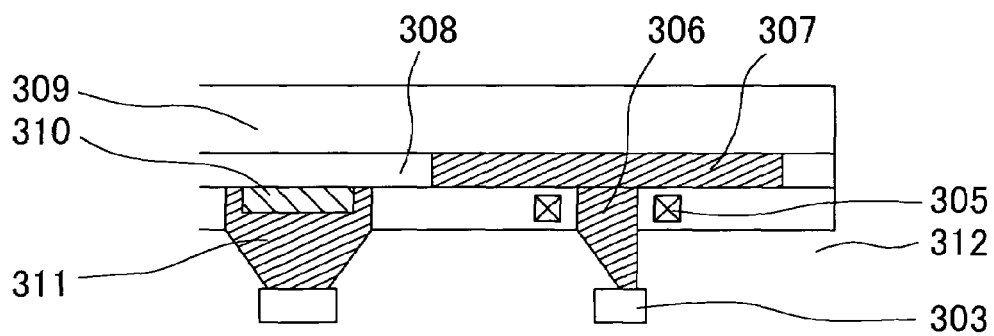

Next, as shown in FIG. 11E, the inorganic insulating layer is etched with this resist pattern served as a mask. When $Al_2O_3$ is used for the inorganic insulating layer, it is preferred to use $BCl_3$ or mixed gas of $BCl_3$ and $Cl_2$ as the etching gas. When AlN is used instead of $Al_2O_3$, the above chlorine system gas is preferred. When $Ta_2O_5$, TiC, $TiO_2$, $SiO_2$, or the like being likely to be etched is used, the fluorine system gas of $CHF_3$, $CF_4$, $SF_6$, $C_4F_8$, or the like can be used.

Figure 11F:
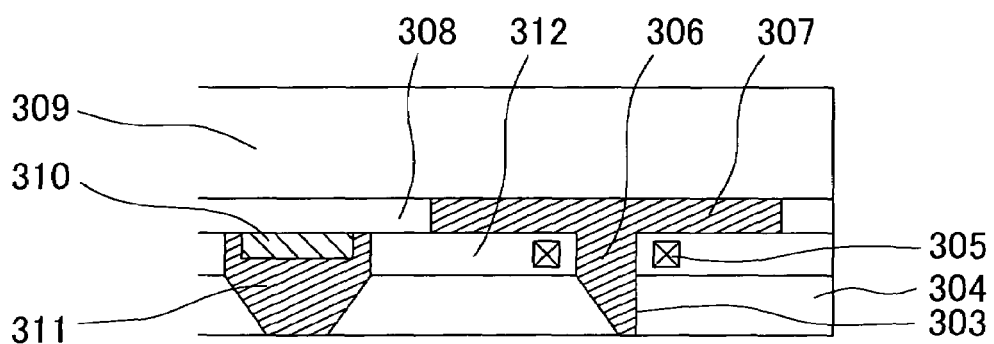

After etching, the resist is removed, and the inorganic insulating layer 304 is again formed, which is flattened as shown in FIG. 11F, by means of the chemical mechanical polishing (CMP) or the like. Finally, the gap of the yoke 311 is formed by means of etching. Hereby, the manufacturing steps of the magnetic head for perpendicular recording of this invention are completed.

Figure 12A:
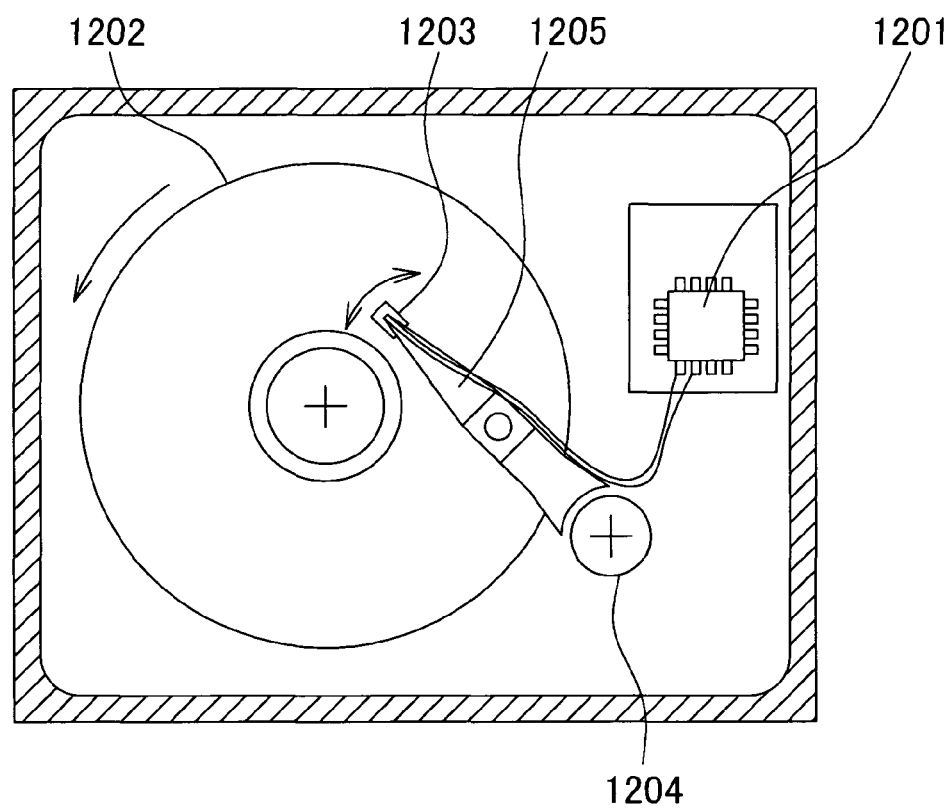
FIG. 12A schematically illustrates the plan view of a magnetic disk drive incorporating the magnetic head for perpendicular recording of the invention.
Figure 12B:
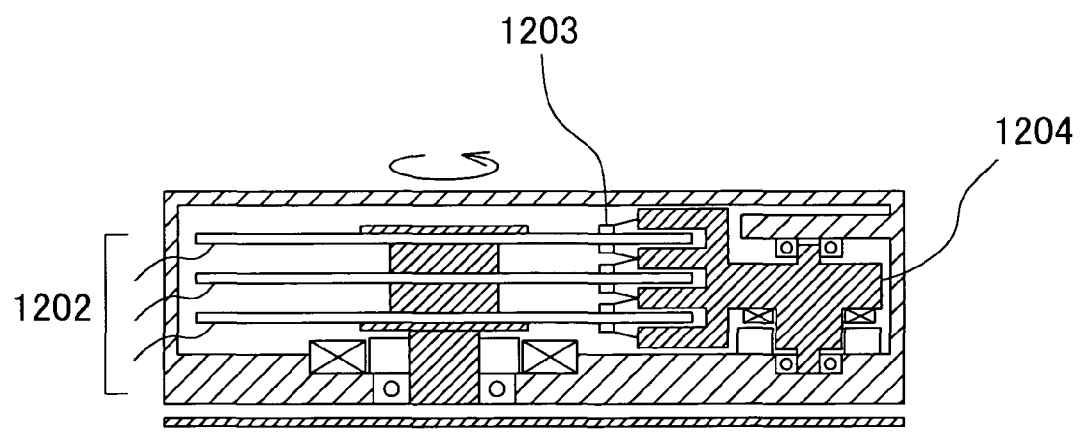
FIG. 12B schematically illustrates the sectional view of a magnetic disk drive incorporating the magnetic head for perpendicular recording of the invention.

FIGS. 12A and 12B schematically illustrate a magnetic disk drive using the magnetic head for perpendicular recording of the invention (here, the magnification of the drawing is not uniform). FIG. 12A is a plan view, and FIG. 12B is a sectional view. The magnetic disk drive records/reproduces magnetization signals on a disk 1202 with the perpendicular recording medium formed, by means of a magnetic head 1203 for perpendicular recording attached to a slider fixed on the end of a suspension arm 1205. A recording/reproducing circuit 1201 generates signals for recording and processes signals reproduced by the magnetic head 1203 for perpendicular recording. A rotary actuator 1204 moves the head to a position where specified information is recorded.

What is claimed is:

1. A magnetic head comprising a perpendicular recording head, wherein:
   the perpendicular recording head comprises a main pole having an air-bearing surface, and a first yoke connected to the main pole;
   a volume of the first yoke is larger than a volume of the main pole; and
   the main pole has four sides including a trailing side, a leading side, a first side substantially parallel to the tracking direction, and a second side substantially parallel to the tracking direction,
   the leading side, the first side and the second side have faces tapering to the air-bearing surface of the main pole, whereas the trailing side does not include a tapering face.

2. A magnetic head as claimed in claim 1, wherein the main pole is connected to the first yoke substantially at the center of the principal plane having the widest area in the yoke.

3. A magnetic head as claimed in claim 1, wherein a coil of at lest one turn for exciting magnetic fluxes in the main pole is formed around the main pole.

4. A magnetic head as claimed in claim 1, further comprising a reproduction head having a magneto-resistive element, wherein the reproduction head has a second yoke formed, which introduces magnetic fluxes leaked from the perpendicular recording medium.

5. A magnetic head as claimed in claim 4, wherein the magneto-resistive element is formed in parallel to the tip surface of the main pole.

6. A magnetic head as claimed in claim 4, wherein:
   the second yoke is composed of two separate magnetic substances; and
   the magnetic substances are each provided on the trailing side and the leading side of the reproduction head.

7. A magnetic head as claimed in claim 6, wherein:
   in the magnetic substance located on the trailing side, at least one or more sides of a side on the trailing side, a first side substantially parallel to the tracking direction, and a second side opposite to the first side, substantially parallel to the tracking direction are slanted against the vertical direction; and
   in the magnetic substance located on the leading side, at least one or more sides of a side on the leading side, the first side substantially parallel to the tracking direction, and the second side opposite to the first side, substantially parallel to the tracking direction are slanted against the vertical direction.

8. A magnetic head as claimed in claim 4, wherein the first yoke also serves as the second yoke.

9. A magnetic head as claimed in claim 4, wherein at least more than one of a side on the leading side of the second yoke, a first side substantially parallel to the tracking direction, and a second side opposite to the first side, substantially parallel to the tracking direction are slanted against the vertical direction.

10. A magnetic head as claimed in claim 1, wherein an angle θ formed by the tip surface of the main pole and the side of the main pole located on the leading side is not smaller than 25° and not larger than 65°.

11. A magnetic head as claimed in claim 1, wherein an angle formed between the first side of the main pole and a face perpendicular to a recording medium or the second side of the main pole and the face perpendicular to the recording medium is 20° or less.

12. A magnetic head as claimed in claim 1, wherein the ratio V2/V1 of a volume V1 of the main pole against a volume V2 of the first yoke is 10 or over.

13. A magnetic disk drive comprising: at least a magnetic perpendicular recording medium having a soft magnetic backing layer and a recording layer on a substrate, and a perpendicular recording head, wherein:
the perpendicular recording head comprises a main pole having an air-bearing surface, and a first yoke connected to the main pole;
a volume of the first yoke is larger than a volume of the main pole; and
the main pole has four sides including a trailing side, a leading side, a first side substantially parallel to the tracking direction, and a second side substantially parallel to the tracking direction,
the leading side, the first side and the second side have faces tapering to the air-bearing surface of the main pole, whereas the trailing side does not include a tapering face.

14. A method of manufacturing a magnetic head having a perpendicular recording head, wherein the perpendicular recording head has a main pole having an air-bearing surface, and a first yoke connected to the main pole a volume of the first yoke is larger than a volume of the main pole; and the main pole has four sides including a trailing side, a leading side, a first side substantially parallel to the tracking direction, and a second side substantially parallel to the tracking direction, the leading side, the first side and the second side have faces tapering to the air-bearing surface of the main pole, the method comprising: an etching step that forms a taper shape from a side facing the medium toward a substrate at least on the leading side of the tip of the main pole, and a flattening step that forms the side facing the medium substantially in parallel to a substrate surface, whereby the main pole is formed, whereas the trailing side does not include a tapering face.

15. A method of manufacturing a magnetic head as claimed in claim 14, further comprising a step of forming an exciting coil that turns on a plane substantially parallel to the substrate surface or the side facing the medium, whereby the main pole is formed.

* * * * *